(12) United States Patent
Kraft et al.

(10) Patent No.: US 6,418,452 B1
(45) Date of Patent: Jul. 9, 2002

(54) NETWORK REPOSITORY SERVICE DIRECTORY FOR EFFICIENT WEB CRAWLING

(75) Inventors: Reiner Kraft, Gilroy; Michael Lawrence Emens, San Jose, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/433,116

(22) Filed: Nov. 3, 1999

(51) Int. Cl.[7] .............................................. G06F 17/30
(52) U.S. Cl. ........................ 707/200; 707/1; 707/10; 707/104.1; 707/201; 707/203; 709/201; 709/203; 709/223; 709/224; 709/225; 709/226
(58) Field of Search ......................... 707/10, 3, 104.1, 707/100, 1, 200, 201, 203; 709/201, 203, 223, 224, 225, 226

(56) References Cited

U.S. PATENT DOCUMENTS

| | | | | |
|---|---|---|---|---|
| 5,845,290 A | | 12/1998 | Yoshii | 707/104 |
| 5,860,071 A | * | 1/1999 | Ball et al. | 707/100 |
| 5,890,152 A | * | 3/1999 | Rapaport et al. | 707/6 |
| 6,038,610 A | * | 3/2000 | Belfiore et al. | 709/300 |
| 6,073,135 A | * | 6/2000 | Broder et al. | 707/100 |
| 6,182,085 B1 | * | 1/2001 | Eichstaedt et al. | 707/104 |
| 6,249,795 B1 | * | 6/2001 | Douglis | 707/511 |
| 6,263,364 B1 | * | 7/2001 | Najork et al. | 709/217 |
| 6,269,370 B1 | * | 7/2001 | Kirsch | 707/10 |
| 6,292,894 B1 | * | 9/2001 | Chipman et al. | 713/168 |
| 6,295,529 B1 | * | 9/2001 | Corston-Oliver et al. | 707/3 |

OTHER PUBLICATIONS

Douglis, F. et al., The AT & T internet difference engine: tracking and viewing changes on the Web, AT & T Labs-Research Technical Report #97.23.1, Apr. 14, 1997.

* cited by examiner

Primary Examiner—John Breene
Assistant Examiner—Cheryl R. Lewis
(74) Attorney, Agent, or Firm—Lumen Intellectual Property Services, Inc.

(57) ABSTRACT

A master repository service maintains a directory of web servers and the most recent times that their web contents were modified, and provides this information to web crawlers to increase their efficiency. The master repository service receives web content update reports from a plurality of web servers, updates the directory to keep it current, and provides crawlers with web site modification information. The web site modification information preferably comprises identifiers for new web sites, "dead" web sites, and modified web sites. Each crawler is preferably provided only with web site modification information received since it last received information from the master repository service. The information allows web crawlers to know immediately about new web sites, and allows them to spend time visiting only those web sites that are new or that have changed their content.

15 Claims, 2 Drawing Sheets

NETWORK REPOSITORY SERVICE DIRECTORY FOR EFFICIENT WEB CRAWLING

CROSS-REFERENCE TO RELATED APPLICATIONS

This application is related to U.S. patent application Ser. No. 09/433,118, pending, filed concurrently herewith, entitled "Network Repository Service for Efficient Web Crawling," by the same inventors, which application is incorporated herein by reference in its entirety.

FIELD OF THE INVENTION

The present invention relates generally to searching and gathering information on computer networks. More specifically, it relates to improved techniques for gathering large amounts of information from a large number of resources on a network, e.g., web crawling.

BACKGROUND OF THE INVENTION

The world wide web (or simply, "the web") has enjoyed explosive growth in recent years, and now contains enormous amounts of information. This information is not centrally stored, but is distributed throughout millions of web servers. Moreover, the information is not static, but is constantly changing as web servers update, add, delete, or otherwise modify the information they make available to the network.

Popular web search engines allow users to quickly search the dynamic, distributed information on the web. Because searching the web directly would take an enormous amount of time, these search engines search a centralized index that summarizes the information stored on the web. An essential component of this approach to web searching is the task of gathering information from web servers ("web crawling") and creating the searchable index from the gathered information.

Conventional web crawling typically involves a systematic exploration of the web to discover and gather information. Because the amount of information on the entire web is so large, web crawling consumes a proportionately large amount of time and network bandwidth, and places a large burden on both the crawlers and the servers. Moreover, because information on the web is constantly and unpredictably changing, the entire web crawling procedure is periodically repeated in order to keep the index information current. If this recrawling is not performed frequently enough, the web index will contain a large amount of obsolete information for some web sites ("undercrawled sites") whose content changes often. On the other hand, if recrawling is performed too frequently, valuable computational and network resources are wasted because a large portion of information has not changed at many web sites ("overcrawled sites").

Conventional web crawling techniques also have the problem that they often do not discover all the information actually available on the web. Their normal strategy for discovering new information is to examine the hyperlinks within known documents. Some information, however, may not have direct hyperlinks from other documents, or may only have direct hyperlinks from other undiscovered documents. As a result, this information is not discovered, gathered, or included into the index used by the search engine.

The present inventors are not aware of any existing techniques by others that effectively address these problems.

U.S. Pat. No. 5,860,071 and ATT Labs Tech. Report #97.23.1 discuss the AT&T Internet Difference Engine (AIDE). The primary purpose of AIDE is to track changes to web documents and display the update information to a user in a personalized manner. This and similar techniques are directed to the problem experienced by users who are browsing large collections of changing web documents, and want to be automatically notified when certain information of interest to them has changed. It is not directed to the problems associated with web crawling, and does not teach any solution to these problems.

SUMMARY OF THE INVENTION

To address the above problems with the current state of the art, the present inventors have developed a network repository service directory for efficient web crawling. The directory provides a centralized registry of web servers currently providing a repository service. The repository service supplements the functions of a web server to enable an increase in the efficiency of web crawling. In particular the repository service: (a) automatically maintains a file modification list that contains the names of files on the server that have been modified (i.e., added, deleted, or otherwise modified), together with the date and time of the file modification; and (b) provides a requesting crawler with the file modification list (or a portion of the list corresponding to a time period specified by the crawler). The repository service may also (c) limit or restrict access privileges of crawlers that do not request the file modification list, thereby protecting the server from overcrawling. The repository service enables a crawler to request the file modification list, and avoid unnecessarily recrawling files that have not been modified since its last visit, thereby preventing considerable waste of time, network bandwidth, server processing resources, and crawler processing resources. Using the file modification list, the crawler can remove all prior references to deleted files, and efficiently recrawl only those files that have been added or changed since the crawler last visited the web server.

The repository service solves the problems associated with both overcrawling and undercrawling. Because crawlers that request the file modification list will not unnecessarily recrawl unmodified files, they will no longer overcrawl web servers whose data is infrequently modified. Crawlers that do not request the file modification list, on the other hand, will have their access limited or restricted, preventing them from overcrawling the web server. The problem of undercrawling is solved by virtue of the increased efficiency in crawling. Because all unnecessary crawling is eliminated, resources are made available for more frequent crawling of information that actually is changing, as well as for other uses. Consequently, any index produced from the information gathered by the crawler will have more current information. The repository service also has the advantage that it informs the crawlers of all new web content. As a result, web crawlers will not miss documents that are not linked to known documents, and the information gathered by the crawler will be more complete.

In order to increase the advantageous use of repository services, a repository service directory (or "master repository service") is also provided. For example, when a new web server is initially connected to the internet, crawlers and other web sites are not automatically aware of its presence. Consequently, these new sites will initially be undercrawled and their content will remain unindexed until crawlers discover them. To address this problem, the master repository service provides a registry for web servers. New web sites that register with the master repository service are included in a directory. Crawlers query the master repository service and are then informed of the most recent servers on the web.

According to another aspect of the invention, the master repository service can include web site modification information for registered web servers. For example, the web site modification information may include, for each registered web server, the time and date of the most recent modification to the web content. Prior to a new crawling session, a crawler queries the master repository service and obtains a list of web servers whose web content has been modified since the time of the crawler's last crawling session. Consequently, the crawler needs to visit only those web servers in the list provided by the master repository service. This technique, therefore, increases the efficiency of the crawler. In addition, it reduces the burden on web servers whose content is relatively constant.

In summary, the master repository service provides advantages to both web servers and web crawlers. Web servers enjoy quick visibility on the web, and are contacted by crawlers only when their web content has changed. Web crawlers, on the other hand, immediately know about new web sites, and need only spend time visiting web sites that have changed their content.

DESCRIPTION OF THE PREFERRED EMBODIMENT

Figure 1:
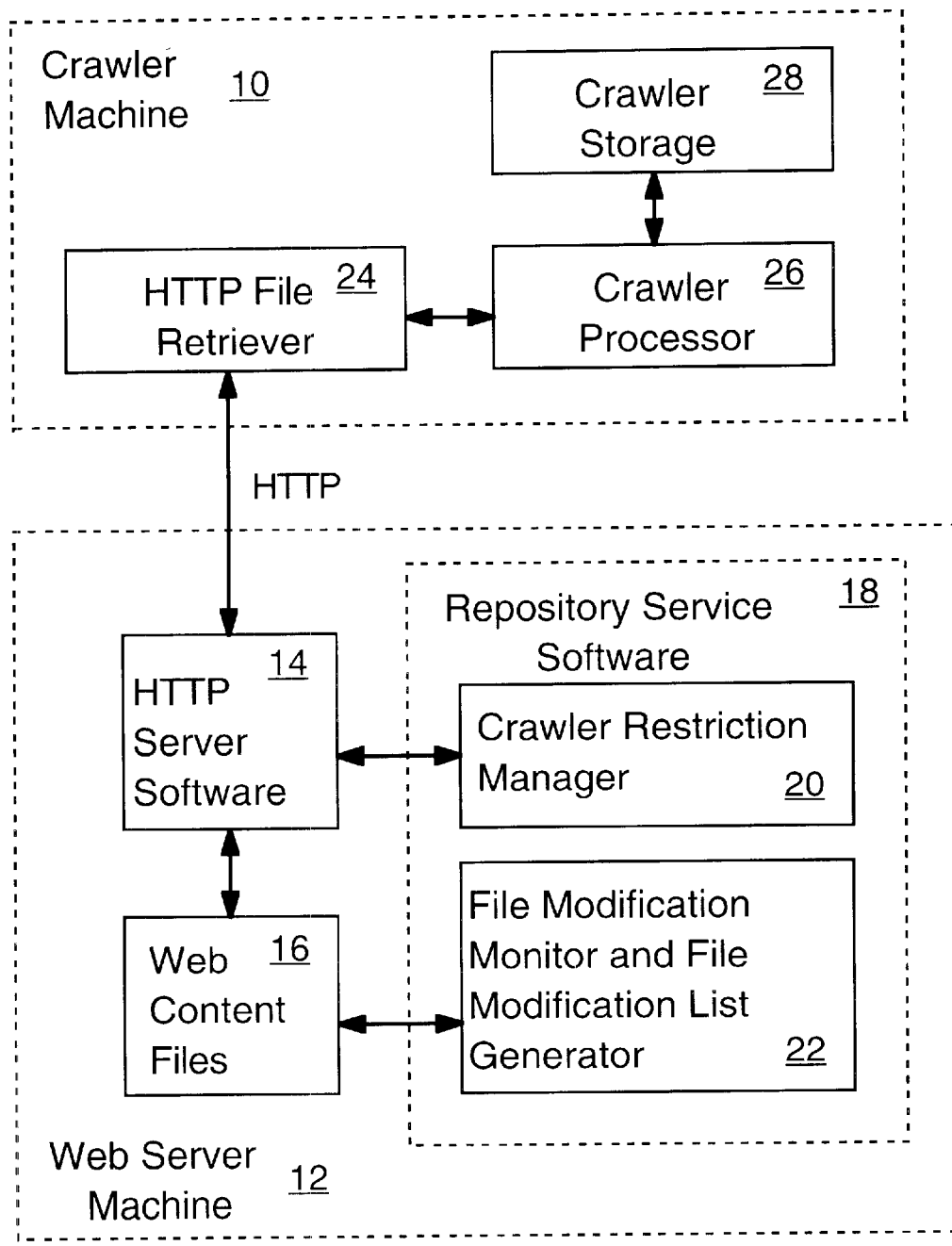
FIG. 1 is a block diagram illustrating a system used to implement a repository service according to one aspect of the present invention.
Figure 2:
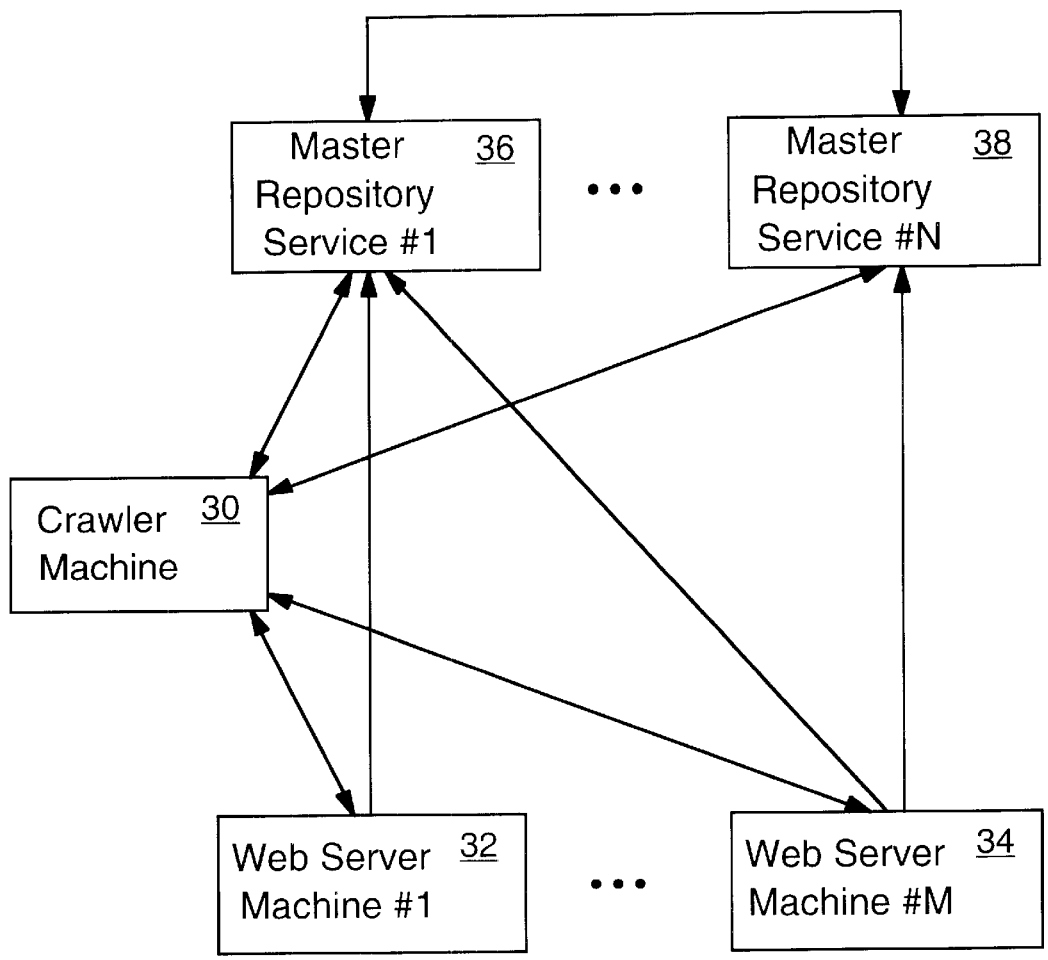
FIG. 2 is a block diagram illustrating a system used to implement a repository service directory according to one aspect of the present invention.

A preferred embodiment of the present invention will now be described in relation to FIGS. 1 and 2. The operation of a repository service will first be described in relation to FIG. 1, which shows a web crawler 10 programmed to navigate the web and gather information from various web servers, such as web server machine 12. The crawler 10 and server 12 preferably communicate over a conventional computer network using hypertext transfer protocol (HTTP) or other standard protocol. With the exception of the distinctive features described below, the crawler and server otherwise operate using standard techniques known in the art. Web server 12 contains HTTP server software 14, web content files 16, and repository service software 18 (preferably implemented as a web server plug-in). In response to HTTP requests from crawler machine 10 (or other HTTP clients), HTTP server software 14 obtains a requested portion of web content files 16 and transmits them back to the crawler using conventional techniques.

The repository service 18 comprises a file modification monitor and file modification list generator 22 that monitors any modifications (i.e., additions, deletions, or other modifications) to the web content files 16. Preferably, this monitoring is performed through interrupt-driven notification by a resident operating system whenever one of the web content files is modified. Alternatively, the monitoring can also be performed by periodic examination of the files and file directories. The file modification monitor and file modification list generator 22 also generates a file modification list that includes a history of modifications to web content files 16. In a preferred embodiment, the file modification list comprises a plurality of entries, each of which comprises a path name of a modified file, a time/date stamp of the modification, and a modification type (e.g., file created, file deleted, or file changed). As web content files are added, removed, or otherwise changed, entries corresponding to these modifications are added to the file modification list. The generated file modification list is then stored as one of the web content files. Preferably, the file modification list is stored as separate files, each of which contains the modifications during a particular time period, e.g., a day or a week. The file modification list can be given a standardized name and stored in the server's root directory.

The crawler machine 10 comprises an HTTP file retriever 24 directed by a crawler processor 26. Retrieved files are processed by crawler processor 26, and index information is stored in crawler storage 28 for further processing or use by a search engine. Because the web content files can change, crawler machine 10 normally has no a priori knowledge of the web content files 16 currently stored on server 12. Consequently, if it were to use conventional crawling techniques, crawler 10 would again submit HTTP requests to explore the web content files in an attempt to discover and gather all the files—regardless of whether or not it has previously indexed the web content 16. This wasteful crawling is avoided, however, by taking advantage of the features of the repository service software 18 on web server 12. Thus, a crawler 10 that is savvy to the capabilities of the repository service software will first request from the server 12 the file modification list (or lists) containing the modification information since crawler last visited server 12. Server 12 responds with the requested file(s), and crawler processor 26 analyzes the files. Using the file modification list, the crawler removes from crawler storage 28 all prior references to files that have been deleted, and then recrawls only those files that have been added or changed since the crawler last visited the web server. It is clear that this technique optimizes recrawling and does not waste valuable resources performing unnecessary recrawling.

It will be appreciated that not all crawlers will necessarily be savvy to the repository service present on server 12. These crawlers will continue to waste resources performing unnecessary recrawling. To prevent or limit this waste of resources, the repository service software includes a crawler restriction manager 20 that recognizes overcrawling and enables server software 14 to limit or restrict such activity. When a crawler fails to request the file modification list, and then proceeds to request a large proportion of the web content files 16, to make a very large number of requests in a very short time interval, or to make requests that systematically mine the web content files 16, the crawler restriction manager 20 detects this activity. The identified crawler is then added to a restriction or deny list, depending on the severity and nature of the overcrawling. Because the server software 14 checks this restriction or deny list prior to fulfilling all requests, if such a crawler persists in overcrawling, its subsequent access to the server web files will be restricted or denied entirely.

In addition to the obvious benefits of improving crawling efficiency, it will also be appreciated that the repository service also has the advantage that it informs the crawlers of all new web content on the server. As a result, web crawlers will not miss documents that are not linked to known documents, and the information gathered by the crawler will be more complete.

It will be appreciated by those skilled in the art that the essential techniques of the repository service may be implemented in various alternate ways other than the specific example shown above. For example, rather than storing the file modification list as one of the web content files, it can be stored in a database format that can be queried by the crawler 10 via a database server feature of the repository service software. In this implementation, the crawler 10 sends its request for the file modification list to the database server rather than to the HTTP server. It will also be appreciated that the file modification list may contain more detailed information relating to the changes to the web content files, and that the database server can be used to provide such information to crawlers.

In order to increase the advantageous use of repository services, a repository service directory (or "master repository service") is also provided, as will now be described in relation to FIG. 2. As shown in the figure, a web crawler machine 30 communicates with a number of web server machines 32 and 34, as described above in relation to FIG. 1, in order to obtain current web content from the web servers. For example, crawler machine 30 may request file modification information from web server machines 32 and 34, and follow-up with crawling activity on one or both of the web servers, as appropriate. The web server machines 32 and 34, in turn, respond with file modification information, and provide web server content to the crawler, as requested. The features of the repository service software operating in web servers 32 and 34 also include the ability to register with one or more master repository services 36 and 38, or update them with site modification information. For example, suppose that web server 34 is new. The repository service software on the web server can automatically send a registration message to one or more master repository service. The registration information preferably includes an identifier for the web server, such as an IP address. It may also include other information, such as a version number of the repository service software. Each master repository service that receives such registration information adds the server's identifier to its master directory of registered web servers. Subsequently, when crawler machine 30 can be notified of all such new web servers, and thus obtain more complete web content during its web crawling procedure.

In addition to sending a registration message to one or more master repository services, registered web servers can also report web site modification information. The web site modification information preferably includes the time and date of the most recent modification to the web content on that server. When a master repository service receives such site modification information, it updates its master directory of registered web sites to include the reported time and date, associated with the identifier of the reporting server. Prior to a new crawling session, crawler 30 preferably queries one or more master repository services 36 or 38. The query preferably includes a time and date when the crawler last queried the master repository service, or when the crawler last received information from the master repository service. The master repository service responds by providing the crawler machine with a list of web servers whose web content has been modified since the time and date reported by the crawler. (This time and date will typically correspond to the time and date of the crawler's last crawling session.) In addition, this list of web servers preferably includes new servers that have registered since the time and date reported by the crawler. The crawler can then efficiently crawl those web servers in the list provided by the master repository service, and avoid unnecessarily visiting web servers whose content has not changed. In addition, the list of web servers preferably also includes "dead" web servers, i.e., servers that are disabled, removed from the internet, or are otherwise inaccessible. The crawler thus knows to remove the content of these servers from its content index. The master repository service might obtain such "dead server" information through notification from the servers prior to their disconnection. It might also obtain this information by periodically polling the list of registered servers. If a server does not respond for specified period of time and/or after specified number of polls, it may be declared "dead" by the repository service. After temporary disconnection or other network service interruption, a web server will be "revived" by the master repository service when the web server reports an update in its web content. The master repository service might also continue polling "dead" servers infrequently in the event that they come back on line.

It should be noted that a master repository service may be configured to automatically send update information to a crawler at periodic intervals. In this case, a crawler that performs a crawl of the web once a week can automatically receive an update just prior to the weekly crawl, without needing to request the information from a repository service.

Although the present invention may be implemented with a single master repository service 36, it can also be implemented with multiple additional master repository services, such as service 38. In this case, it is preferable to coordinate and share the information between the master repository services so that if a web server reports to a single master repository service, the reported information is automatically shared among all the other master repository services. More specifically, changes in the master directory at one master repository service are automatically propagated to the other services within a specific time interval, e.g., each hour or each day. The propagation preferably is performed by assigning to each master repository service one or more other services to which it automatically propagates information reported from a web server. For example, if server 32 reports updated web content to master repository service 36, but not to master repository service 38, then the update information will be transmitted from master repository service 36 to master repository service 38. As a result, if crawler queries service 38 rather than service 36, it will still receive the updated information reported to service 36. Various specific mechanisms and techniques used for database replication are well known in the art.

It should be noted that the master repository service and the crawler are not necessarily distinct machines, but may be the same machine. It will also be noted that more than one crawler may be simultaneously configured to take advantage of the techniques of the present invention. It will also be noted that provisions can be made to allow only certain registered crawler machines to access and benefit from the master repository service and/or from repository service software installed on the web servers. Similarly, master repository services may have provisions for controlling what web servers are allowed to register with them.

In another aspect of the invention, the techniques described above are implemented in the form of a program of instructions executable by the master repository service machine. Using techniques well known in the computer arts, such a program is tangibly embodied within a computer program storage device accessible by the master repository service machine, e.g., within a memory or other media storage device of the master repository service machine.

Although the present invention has been shown and described with reference to a preferred embodiment, equivalent alterations and modifications will occur to those skilled in the art upon reading and understanding this specification.

The present invention includes all such equivalent alterations and modifications and is limited only by the scope of the following claims.

What is claimed is:

1. In a computer network comprising a master repository service machine, a plurality of web server machines, and a web crawler machine, a method comprising:
   a) automatically maintaining on each of the web server machines a file modification list describing modifications made to corresponding web content files stored thereon;
   b) transmitting from each of the web server machines to the master repository service machine a web site modification report derived from the file modification list, wherein the web site modification report comprises a last updated time indicating when web content on the corresponding web server machine was last updated;
   c) transmitting from the web crawler machine to the master repository service machine a request for web site modification information, wherein the request comprises a last visited time indicating when the web crawler machine last visited the master repository service machine; and
   d) transmitting from the master repository service machine to the web crawler machine the requested web site modification information, wherein the requested web site modification information comprises web server identifiers corresponding to updated web servers whose last updated time is later than the last visited time of the web crawler machine.

2. The method of claim 1 further comprising transmitting from the master repository service machine to another master repository service machine recent web site modification information derived from web site modification reports received by the master repository service machine.

3. The method of claim 1 further comprising transmitting from the crawler machine to the updated web servers requests for modified file information.

4. In a master repository service machine, a method comprising:
   a) receiving from a web server web site modification information comprising a most recent modification time indicating most recent modification to web content on the web server;
   b) updating a directory of web servers to include the web site modification information, wherein the directory comprises a plurality of web server identifiers and a corresponding plurality of most recent modification times; and
   c) transmitting to a web crawler machine a customized list of web server identifiers, wherein the customized list corresponds to web servers whose web content has been modified since the web crawler machine last received information from the master repository service machine.

5. The method of claim 4 further comprising transmitting a recently updated portion of the directory to another master repository service machine.

6. The method of claim 4 further comprising receiving from the web server a request for registration with the master repository service, wherein the request comprises an identifier for the web server.

7. In a web crawler machine, a method comprising:
   a) receiving web site modification information from a master repository service machine, wherein the web site modification information comprises web server identifiers corresponding to web servers whose web content has been modified since the web crawler machine last received information from the master repository service;
   b) transmitting to the web servers requests for file modification information; and
   c) receiving from the web servers the requested file modification information comprising names of files modified since the web crawler last visited the web servers; and
   d) transmitting from the web crawler machine to the web servers requests for the modified files.

8. The method of claim 7 further comprising transmitting to the master repository service machine a request for the web site modification information, wherein the request comprises a time that the web crawler machine last received information from the master repository service machine.

9. The method of claim 7 wherein the web site modification information further comprises web server identifiers corresponding to web servers whose web content was made unavailable since the web crawler machine last received information from the master repository service.

10. A program storage device accessible by a master repository service machine, tangibly embodying a program of instructions executable by the master repository service machine to perform method steps comprising:
    a) receiving from a web server web site modification information comprising a most recent modification time indicating most recent modification to web content on the web server;
    b) updating a directory of web servers to include the web site modification information, wherein the directory comprises a plurality of web server identifiers and a corresponding plurality of most recent modification times; and
    c) transmitting to a web crawler machine a customized list of web server identifiers, wherein the customized list corresponds to web servers whose most recent modification times are later than a time that the web crawler machine last received information from the master repository service machine.

11. The device of claim 10 wherein the method further comprises transmitting a recently updated portion of the directory to another master repository service machine.

12. The device of claim 10 wherein the method further comprises receiving from the web server a request for registration with the master repository service, wherein the request comprises an identifier for the web server.

13. A computer network system comprising a master repository service machine, a web crawler machine connected to the master repository service machine, and a plurality of web server machines connected to both the master repository service machine and the web crawler machine, wherein:
    a) each of the web server machines automatically maintains a file modification list describing modifications made to corresponding web content files stored thereon;
    b) each of the web server machines transmits to the master repository service machine a web site modification report derived from the file modification list maintained on the corresponding web server machine, wherein the web site modification report comprises a last updated time indicating when web content on the corresponding web server machine was last updated;
    c) the web crawler machine transmits to the master repository service machine a request for web site modification information, wherein the request comprises a last visited time indicating when the web crawler machine last visited the master repository service machine; and d) the master repository service machine transmits to the web crawler machine the requested web site modification information, wherein the requested web site modification information comprises web server identifiers corresponding to updated web servers whose last updated time is later than the last visited time of the web crawler machine.

14. The system of claim 13 wherein the master repository service machine transmits to another master repository service machine recent web site modification information derived from web site modification reports received by the master repository service machine.

15. The system of claim 13 wherein the crawler machine transmits to the updated web servers requests for modified file information.

* * * * *